O. D. SHONNARD.
COUPLING AND BRAKE CONNECTION FOR VEHICLES.
APPLICATION FILED OCT. 24, 1918.
1,386,902.
Patented Aug. 9, 1921.
4 SHEETS—SHEET 1.
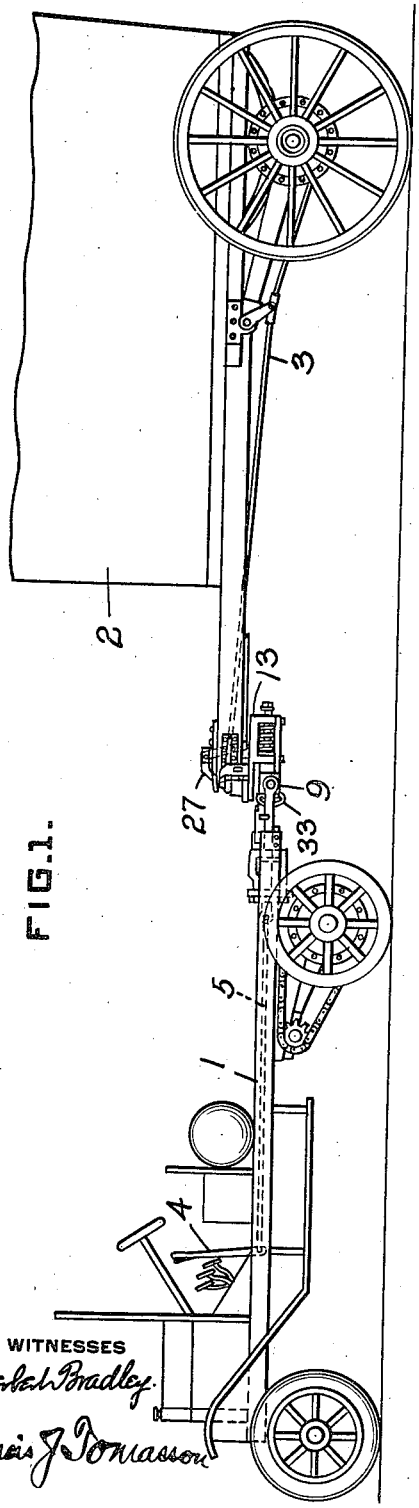
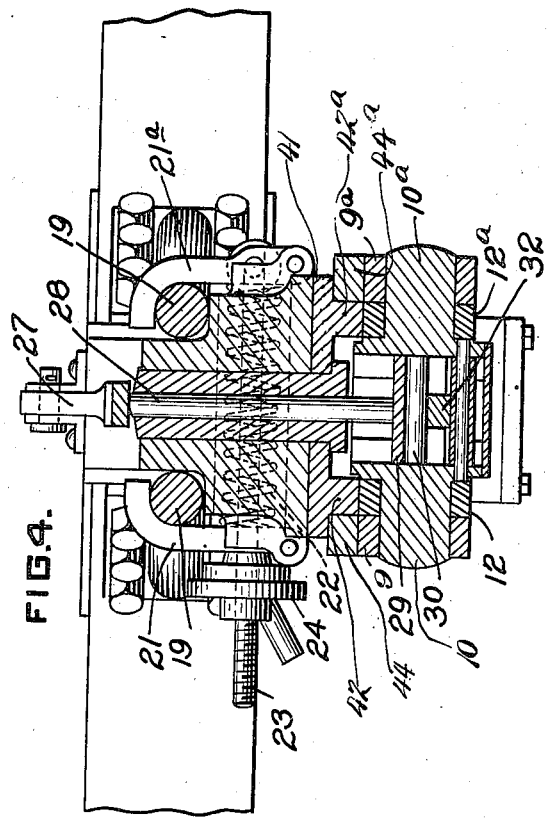
WITNESSES
INVENTOR O. D. SHONNARD.
COUPLING AND BRAKE CONNECTION FOR VEHICLES.
APPLICATION FILED OCT. 24, 1918.

1,386,902.

Patented Aug. 9, 1921.
4 SHEETS—SHEET 2.

O. D. SHONNARD.
COUPLING AND BRAKE CONNECTION FOR VEHICLES.
APPLICATION FILED OCT. 24, 1918.
1,386,902.
Patented Aug. 9, 1921.
4 SHEETS—SHEET 3.
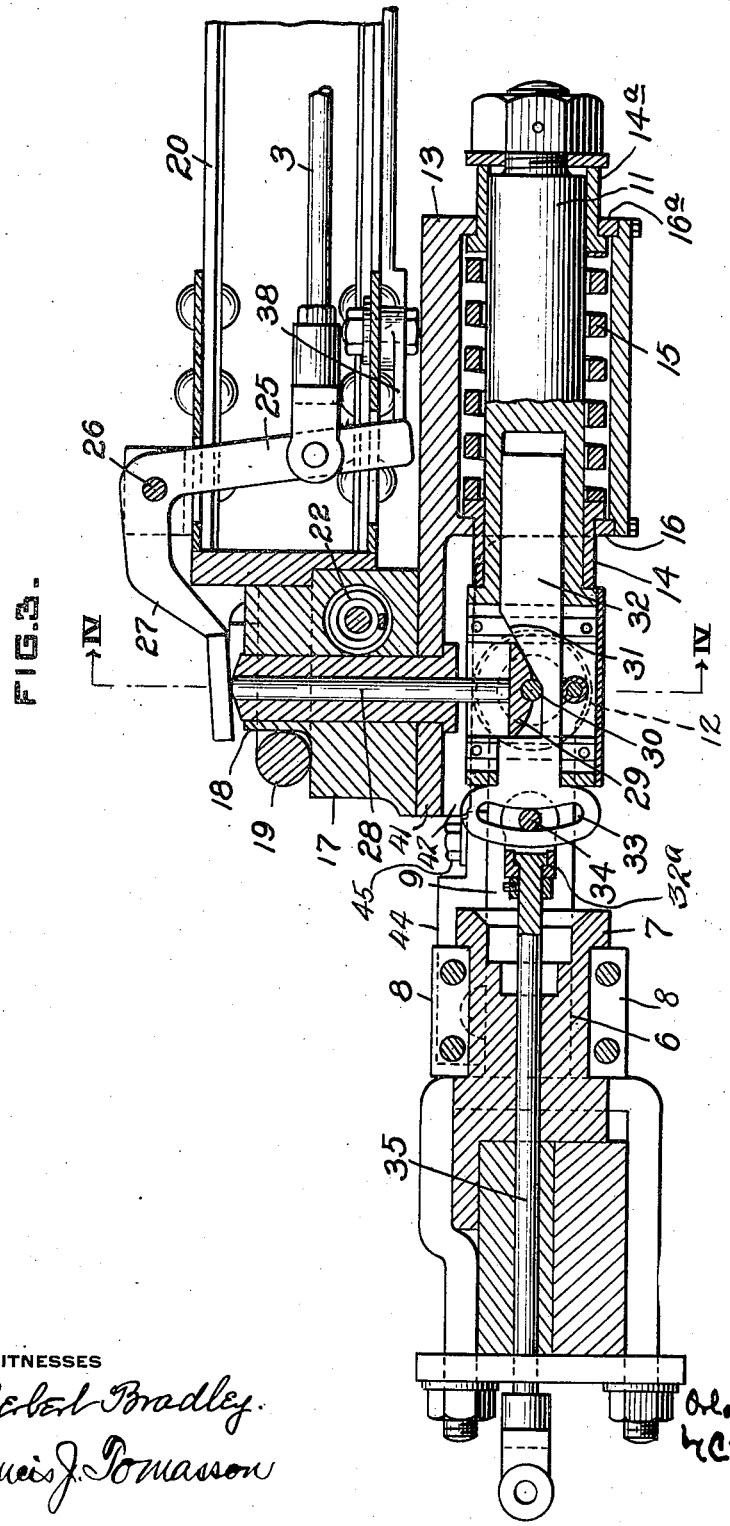
WITNESSES
J. Herbert Bradley.
Francis J. Tomasson
INVENTOR
Orlando D. Shonnard
by Christy & Christy
Attys.

O. D. SHONNARD.
COUPLING AND BRAKE CONNECTION FOR VEHICLES.
APPLICATION FILED OCT. 24, 1918.
1,386,902.
Patented Aug. 9, 1921.
4 SHEETS—SHEET 4.
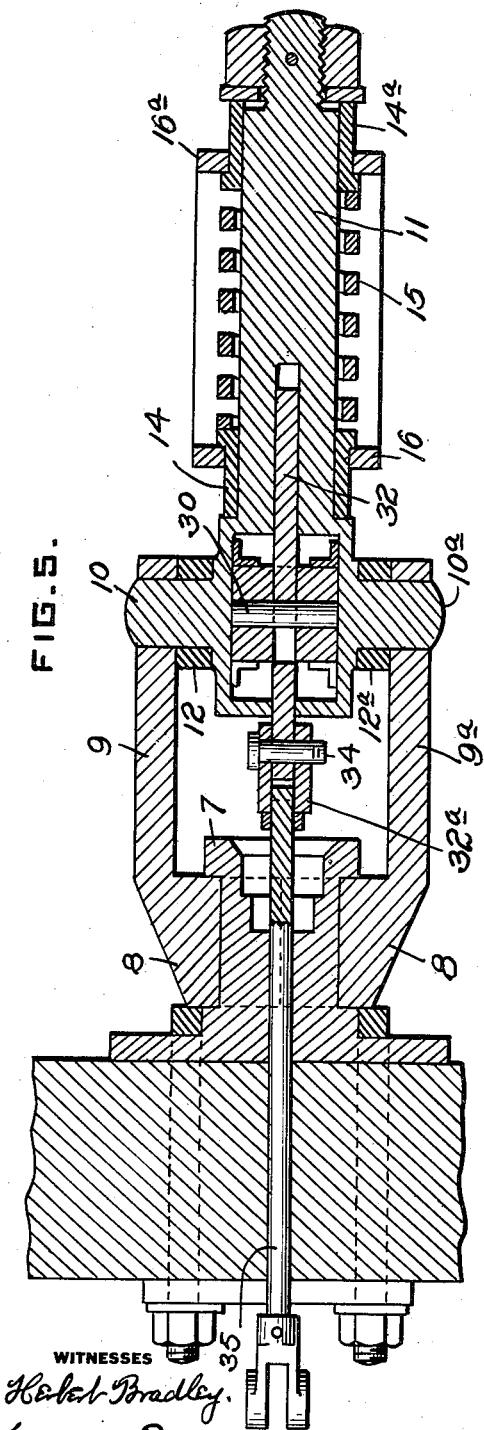
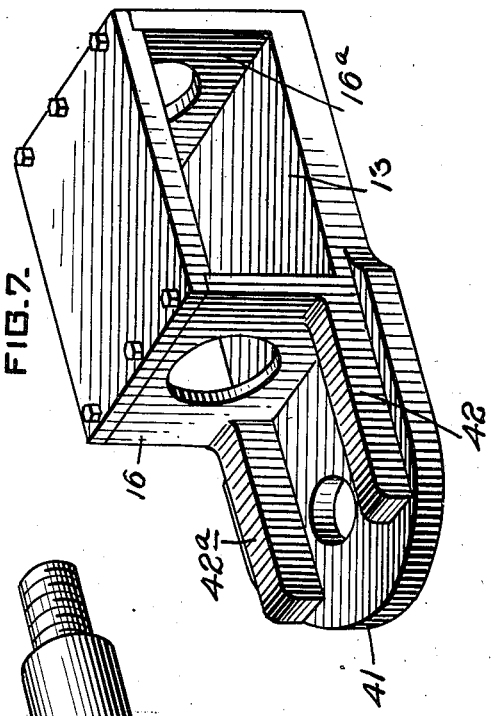
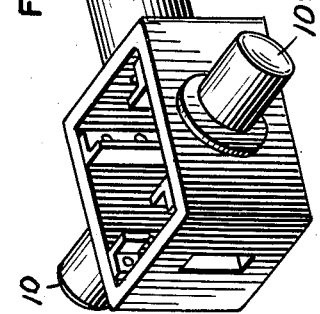
WITNESSES
J. Herbert Bradley.
Francis J. Tomasson
INVENTOR
Orlando D. Shonnard
by Christy and Christy
his attorneys

UNITED STATES PATENT OFFICE.

ORLANDO D. SHONNARD, OF UPPER MONTCLAIR, NEW JERSEY, ASSIGNOR OF ONE-THIRD TO HAROLD W. SHONNARD, OF UPPER MONTCLAIR, NEW JERSEY.

COUPLING AND BRAKE CONNECTION FOR VEHICLES.

1,386,902.      Specification of Letters Patent.      Patented Aug. 9, 1921.

Application filed October 24, 1918. Serial No. 259,476.

*To all whom it may concern:*

Be it known that I, ORLANDO D. SHONNARD, residing at Upper Montclair, in the county of Essex and State of New Jersey, a citizen of the United States, have invented or discovered certain new and useful Improvements in Coupling and Brake Connections for Vehicles, of which improvements the following is a specification.

In Letters Patent of the United States, No. 1,300,003, granted April 8, 1919, to Clifford S. Peets and Orlando D. Shonnard for improvements in brakes there is shown and described a tractor and a trailer pivotally attached to each other by a connection permitting relative longitudinal movement between them. The trailer is provided with a brake, the tractor with brake-operating mechanism, and from such operating mechanism to the brake there extends a line of connections so constructed that the brake will respond instantaneously to the movement of the operating mechanism regardless of the relative pivotal and longitudinal positions of the tractor and trailer. In said application the specifically illustrated type of connection between the tractor and trailer is a fifth wheel permitting pivotal movements on a vertical axis and on a horizontal axis at right angles to the general line of extent of the two vehicles.

My invention has to do with the same general subject matter as is contemplated in the above named patent application, and the object thereof is to provide an improved connecting or coupling mechanism between two vehicles such as a tractor and a trailer, or between two trailers, in which latter case the forward trailer becomes in effect a tractor for the succeeding trailer, such connection permitting pivotal movement between the tractor and trailer on a horizontal axis substantially parallel with the general line of extent of such vehicles.

A further object of my invention is to provide for a tractor and trailer, connected for pivotal movement on a horizontal axis substantially parallel with the general line of extent of such vehicles, a brake for the trailer, brake operating mechanism on the tractor, and connections between such mechanism and brake adapted to accomplish the above explained result attained by the construction shown in the aforementioned application.

In the accompanying sheet of drawings I have illustrated the preferred embodiment of my invention. Figure 1 is a side view of a tractor and trailer showing the general arrangement of the pivotal connection between them, and showing also the general arrangement of the trailer brake and its operating mechanism; Fig. 2 a plan view to enlarged scale of the connection between the tractor and trailer; Fig. 3 a vertical sectional view taken on the line III—III Fig. 2; Fig. 4 a vertical sectional view taken on the line IV—IV, Fig. 3; Fig. 5 is a central horizontal section passing through the axis of the coupler and associated parts; Fig. 6 is a view in perspective of the bar portion of the coupler; and Fig. 7 is a view in perspective of the sleeve portion of the coupler, this member being in this figure illustrated in inverted position as compared with Fig. 3, and bottom side up (the position of normal operation being in mind).

While my invention is applicable to various types of vehicles, it is shown herein in its adaptability to a four-wheeled tractor 1, and two-wheeled trailer 2, as indicated in Fig. 1. The trailer is provided with any suitable form of brake adapted to be operated by the longitudinal movement of a rod 3, and the tractor is provided with the usual form of brake-operating lever 4 connected to a reciprocable rod 5 disposed longitudinally of the tractor at its central portion.

As already indicated, one feature of my invention has to do with the provision of a connection for vehicles such as contemplated herein, which connection will permit of a relative pivotal movement between the two vehicles on a horizontal axis disposed substantially parallel with the general line of extent of the two vehicles. The connection which I provide affords such pivotal movement, and in addition thereto also affords pivotal movements on a horizontal axis substantially at right angles to that just named, and on a vertical axis. Furthermore, the connection is such as will permit of relative longitudinal movements between the two vehicles.

Having reference first to the connection between the two vehicles, and omitting reference for the present to the brake operating connection, one of the vehicles, preferably the tractor, is provided with a drawhead 6, Fig. 3, which may be of any suitable construction, but which is preferably provided at its end with an enlarged head 7 adjacent to a cylindrical portion on which there is mounted for rotary movement a yoke 8. Extending rearwardly from the yoke 8 there are a pair of arms 9, 9ª provided at their ends with bearings adapted to receive horizontally disposed lugs 10, 10ª formed on the forward end of the coupler. The coupler is preferably formed of two main parts adapted to move longitudinally with respect to each other, but held yieldingly in an intermediate position by means of a spring, which parts preferably comprise a cylindrical bar 11, to the forward end of which the lugs 10 and 10ª are attached, and a sleeve 13 surrounding the bar 11. Slidably mounted upon the bar 11 between such bar and sleeve 13 there are a pair of flanged rings 14—14ª disposed one at each end of the bar; and a spring 15, acting at its opposite ends against the flanges of such rings, is arranged between the bar and sleeve. The sleeve 13 is provided with a pair of flanges 16—16ª adapted to engage the flanges on the rings 14, 14ª. Formed integrally with, and at the forward end of, the sleeve 13 there is a plate 41 provided on its lower face with a pair of ribs 42, 42ª adapted to rest upon roller rings 12, 12ª rotatably mounted upon the lugs, 10, 10ª. By such construction the main coupler parts 11 and 13 are held against relative rotation on the axis of the bar 11.

By such coupler arrangement, when a pull is exerted on the bar 11 the sleeve 13 will move rearwardly with respect to the bar, such movement being resisted by the spring 15. Under such condition the right end of the spring as viewed in Fig. 3 is held firmly by means of the ring 14ª, but the spring may be compressed from its left-hand end, the flanged rings 14 sliding upon the bar 11 until the resistance offered by the spring equals or exceeds that of the tractive force applied to the bar 11.

While various means may be provided for connecting the coupler to the trailer, the sleeve 13 of the coupler is preferably provided with a block 17 having at its upper end a vertically disposed semi-cylindrical portion 18 adapted to be received by a yoke 19 suitably connected to the frame 20 of the trailer. For locking the yoke 19 against vertical movement and thereby preventing the trailer from becoming detached from the tractor, there are provided a pair of fingers 21—21ª yieldingly pressed outwardly by means of a spring 22. For closing the fingers on the yoke 19 a bolt 23, pivotally connected to finger 21ª extends through the finger 21, and is provided with a nut 24 adapted to bear on the outer face of the finger 21. Thus, to release the fingers 21, 21ª from their yoke-engaging position indicated in the drawings, the nut 24 may be unscrewed to permit the spring 22 to force the fingers outwardly, and to lock the fingers it will only be necessary to tighten the nut 24.

Means for maintaining the coupler in horizontally extending position even when no trailer is attached remain to be explained. It will be noted that without such means the coupler would droop when there was no trailer attached, the whole coupler structure would turn on the pivotal connection between arms 9, 9ª and pins 10, 10ª and the weight of the coupler would carry it downward to drooping position, which would bring a strain upon the connected parts; and, in addition to that, when it came to making a coupling connection with a trailer, the coupler would have to be lifted and held in position while connection was being made with the trailer. Referring particularly to Figs. 2, 3 and 4, it will be seen that upon the upper surfaces of arms 9, 9ª extend bars 44, 44ª. These bars are pivoted at one end and at medial points of arms 9, 9ª by the pivot bolts 45, 45ª, to the end that they may swing from the inactive position clearly shown in Fig. 2 through a swing of 180° to a position best shown in section on Fig. 4. In Fig. 2 I have shown in dotted line these bars in intermediate position in their range of swinging. When in the inactive position shown in Fig. 3 they take no part in the operation. This is the position in which they remain while the coupler is active and while the trailer is connected; but, when the trailer is to be disconnected leaving the coupler inactive, then, before uncoupling, these two bars 44, 44ª are swung rearwardly, until they come to the position illustrated in Fig. 4. In that position these two bars extending beneath the plate 41, which forms part of the coupler sleeve 13, sustain the entire coupler and prevent it when released from drooping.

When these bars 44, 44ª are in the inactive position shown in Fig. 3, they are conveniently held in that inactive position by means of U-shaped locks 46, 46ª, pivotally mounted upon the bars themselves and adapted to be turned to engage the arms 9, 9ª.

The connections which I provide between the trailer brake and operating lever 4 of the tractor are such that the brake will respond instantaneously to the movement of the operating lever regardless of the relatively pivotal or longitudinal positions of the tractor and trailer. To such end the brake operating connections preferably pass through the various pivotal axes of the connection between tractor and trailer. As indicated particularly in Figs. 2 and 3, the trailer brake rod 3 may be attached to the arm 25 of a bell crank lever pivoted as at 26, and the other arm 27 of such lever may lie in the path of reciprocation of vertically disposed pin 28. The lower end of the pin 28 loosely bears upon a vertically movable block 29 having an extended horizontal face over which the end of the pin may move as the tractor and trailer move longitudinally with respect to each other. Secured to the lower face of the movable block 29 there is a bearing pin 30 adapted to rest upon an inclined face 31 of a longitudinally reciprocable member 32. The forward end of the member 32 is provided with a slot 33 which lies in an arc having its center of curvature at the center of the lugs 10, 10ª, and in such slot there is arranged a pin 34 secured to a longitudinally reciprocable rod 35 lying in the axis of rotation of the yoke 8, and attached to the brake operating rod 5 of the tractor. To permit rotary movement between rod 35 and the member 32, pin 34 is secured to a clevis 32ª rotatably mounted on the enlarged end of the rod 35.

In applying the trailer brake, the tractor brake operating lever 4, Fig. 1, is moved to cause the rod 5 to move forwardly. This rod being attached to the rod 35, Fig. 3, causes the latter rod as well as the member 32 to move in the same direction. As the member 32 moves forwardly it raises the block 29, which block in turn raises the pin 28 regardless of what portion of the upper face of such block the lower end of the pin may be resting upon. The upper end of the pin 28 raises the arm 27 of the bell crank lever, and the arm 25 thereof is thus caused to move forwardly and to carry with it the trailer brake operating rod 3 which has the effect of applying the trailer brake.

To the end that the trailer brake may be maintained locked when the trailer is detached from the tractor, I preferably provide a hand-operated lever 36, Fig. 2, pivoted as at 37, and provided with a cam face 38 adapted to bear against the lower end of the arm 25 of the bell crank lever 25, 27.

According to the provisions of the patent statutes, I have described the operation and principle of my invention together with the construction which I now consider to represent the best embodiment thereof. However I desire to have it understood that, within the scope of the appended claims, my invention may be practised by other forms of construction than that particularly shown and described herein.

I claim as my invention:

1. The combination with a tractor and a trailer, of means for connecting said trailer to said tractor for pivoted movement about a vertical axis and about a horizontal axis substantially parallel with the general longitudinal extent of the tractor and trailer, a brake on said trailer, means on said tractor for operating said brake, and rigid connections extending from said brake operating means to said brake whereby said brake will respond instantaneously to the movement of the brake operating means irrespective of the relative positions of the tractor and trailer.

2. The combination with a tractor and a trailer, of means for connecting said trailer to said tractor for pivotal movement about a vertical axis and about two horizontal axes substantially at right angles to each other, one of which horizontal axes is substantially parallel with the general line of extent of the tractor and trailer, a brake on said trailer, means on said tractor for operating said brake, and rigid connections extending from said brake operating means to said brake whereby said brake will respond instantaneously to the movement of the brake-operating means irrespective of the relative positions of the tractor and trailer.

3. The combination with a tractor and a trailer, of means for connecting said trailer to said tractor for pivotal movement about an axis substantially parallel with the general line of extent of the tractor and trailer, said connections permitting relative longitudinal movement between the tractor and trailer, a brake on said trailer, means on said tractor for operating said brake, and rigid connections extending from said brake operating means to said brake whereby said brake will respond instantaneously to the movement of the brake-operating means irrespective of the relative positions of the tractor and trailer.

4. The combination with a tractor and trailer, of means for connecting said trailer to said tractor for pivotal movement on a vertical axis and about two horizontal axes substantially at right angles to each other, one of which said horizontal axes is substantially parallel with the general line of extent of the tractor and trailer, said connections including means permitting relative longitudinal movement between the tractor and trailer, a brake on said trailer, means on said tractor for operating said brake, and connections extending from said brake operating means through said pivot axes to said brake, whereby said brake will respond instantaneously to the movement of the brake-operating means irrespective of the relative positions of the tractor and trailer.

5. The combination with a tractor and a trailer, of a draw head secured to said tractor, a yoke attached to said draw-head for pivotal movement on an axis substantially parallel with the longitudinal extent of said tractor, a coupler secured to said yoke for pivotal movement on a horizontal axis substantially at right angles to said first named axis, means for connecting said trailer to said coupler for pivotal movement on a vertical axis.

6. The combination with a tractor and a trailer, of a draw-head secured to said tractor, a yoke attached to said draw-head for pivotal movement on an axis substantially parallel with the longitudinal extent of said tractor, an extensible coupler secured to said yoke for pivotal movement on a horizontal axis substantially at right angles to said first-named horizontal axis, means for connecting said trailer to said coupler for pivotal movement on a vertical axis.

7. The combination of a tractor and a trainer, the tractor being provided with a brake lever and the trailer provided with a brake-shoe, of an intermediate coupling member expansible in a direction longitudinally of tractor and trailer and affording pivotal motion between tractor and trailer on a longitudinal axis, and brake-operating mechanism through which the brake-operating lever on the tractor is connected with the brake shoe on the trailer, said mechanism including a bar with an inclined surface borne by said connecting member and reciprocable longitudinally thereof and a member movable at right angles in response to reciprocation thereof.

8. The combination of a tractor and a trailer, a brake lever borne by the tractor, a brake-shoe borne by the trailer, a member uniting trailer with tractor, said member including a stirrup rotatably connected to one of the two said vehicles on a longitudinal axis, a longitudinally expansible member pivoted to said stirrup member on a transverse axis, said expansible member being connected to the other of the two said vehicles, a reciprocable slide borne axially in said expansible member, said slide being provided with a slot normally concentric with the transverse pivotal axis mentioned, a tension member connected with the brake-operating lever on the tractor and engaging said slide through such slot, and means operable on the reciprocation of said sliding member for moving the brake-shoe on the trailer.

In testimony whereof I have hereunto set my hand.

ORLANDO D. SHONNARD.

Witnesses:
E. A. WAKEFIELD,
ELMER HUEBSCH.